US00RE45852E

(19) United States
(12) Reissued Patent
Pareti

(10) Patent Number: US RE45,852 E
(45) Date of Reissued Patent: Jan. 19, 2016

(54) SWIMMING POOL CLEANING DEVICE

(71) Applicants: Laura Travagliati, Verona (IT)
MAYTRONICS LTD., Kibbutz Yizreel (IL)

(72) Inventor: Vittorio Pareti, Verona (IT)

(73) Assignee: MAYTRONICS, LTD., Kibutz Yizrael (IL)

(21) Appl. No.: 13/848,184

(22) Filed: Mar. 21, 2013

Related U.S. Patent Documents

Reissue of:
(64) Patent No.: 7,908,696
Issued: Mar. 22, 2011
Appl. No.: 11/349,836
Filed: Feb. 8, 2006

(30) Foreign Application Priority Data

Feb. 8, 2005 (IT) ..... PD2005A0028

(51) Int. Cl.
*E04H 4/16* (2006.01)

(52) U.S. Cl.
CPC ..... *E04H 4/1663* (2013.01); *E04H 4/1654* (2013.01)

(58) Field of Classification Search
USPC ..... 15/1.7, 1.51, 1.52, 3, 339; 210/167.16, 210/169; 134/6
See application file for complete search history.

(56) References Cited

U.S. PATENT DOCUMENTS 513,438 A 1/1894 Palmer
3,906,572 A * 9/1975 Winn ..... 15/1.7
3,950,809 A 4/1976 Schatzmann
3,979,788 A * 9/1976 Strausak ..... 15/1.7
3,995,392 A 12/1976 Benkoe et al.
4,103,519 A * 8/1978 Davidson ..... 68/3 SS
4,168,557 A * 9/1979 Rasch et al. ..... 15/1.7
5,001,800 A 3/1991 Parenti et al.
5,205,174 A 4/1993 Silverman et al.
5,245,723 A 9/1993 Sommer
5,327,611 A 7/1994 Balster et al.
5,435,031 A 7/1995 Jensen et al.
5,454,129 A * 10/1995 Kell ..... 15/1.7
5,569,371 A * 10/1996 Perling ..... 210/85
5,940,927 A 8/1999 Haegermarck et al.
6,039,886 A * 3/2000 Henkin et al. ..... 210/776
6,115,864 A * 9/2000 Davidsson et al. ..... 15/1.7
6,199,237 B1 3/2001 Budden
6,212,725 B1 4/2001 Porat (Continued)

FOREIGN PATENT DOCUMENTS

DE 4012467 10/1991
DE 9216310 3/1993

(Continued)

*Primary Examiner* — Dung Van Nguyen
(74) *Attorney, Agent, or Firm* — Reches Patents

(57) ABSTRACT

A swimming pool cleaning assembly that has at least one ultrasonic generator, a swimming pool cleaning machine including a support frame, a housing shell provided with a bottom wall and arranged around the support frame, a driver located in the housing shell, advancer supported by the frame and arranged to be place, in use, on a surface to be cleaned of a swimming pool and driven, at least one water suction opening provided in the bottom surface of the housing shell, which is designed to be put in fluid communication with water suction, driver being tightly sealed in the housing shell and electrically connectable to the supply, the ultrasonic generator being arranged at the bottom wall facing, in use, the surface to be cleaned.

45 Claims, 8 Drawing Sheets

(56) References Cited

U.S. PATENT DOCUMENTS

| | | | | |
|---|---|---|---|---|
| 6,292,970 | B1 | 9/2001 | Rief et al. | |
| 6,758,226 | B2 | 7/2004 | Porat | |
| 7,118,632 | B2 * | 10/2006 | Sumonthee | 134/6 |
| 7,346,428 | B1 | 3/2008 | Huffman et al. | |
| 7,441,298 | B2 | 10/2008 | Svendsen et al. | |
| 2001/0050093 | A1 | 12/2001 | Porat | |
| 2004/0045104 | A1 | 3/2004 | Pichon | |
| 2004/0231075 | A1 | 11/2004 | Stoltz | |
| 2006/0174430 | A1 | 8/2006 | Pareti | |
| 2007/0157413 | A1 | 7/2007 | Roumagnac | |
| 2008/0250580 | A1 | 10/2008 | Lavabre et al. | |

FOREIGN PATENT DOCUMENTS

| | | |
|---|---|---|
| FR | 2079942 | 11/1971 |
| WO | WO2004103912 | 12/2004 |

* cited by examiner

SWIMMING POOL CLEANING DEVICE

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

FIELD OF INVENTION

The present invention relates to a swimming pool cleaning device.

BACKGROUND OF INVENTION

Swimming pool cleaning machines are known and largely adopted at present, which comprise a frame supported by driving means, e.g. an electric motor designed to drive a number of small wheels or tracks arranged to move the cleaning machine backward and forward on an inner surface of a swimming pool, and one or more inlet openings arranged to suck from the bottom of the machine, the whole assembly being arranged in a housing shell.

The driving means is tight sealed in the housing shell and generally electrically connected by means of an electric cable, preferably provided with a float, to power mains through a transformer or a low-tension power supply located near to the swimming pool.

Generally speaking, the electric motor also drives a pair of rotatable brushes having their axes of rotation parallel to one another and arranged at two opposite sides of the cleaning machine, i.e. one in front and the other at the rear of cleaning machine.

In bottom of the housing shell, i.e. the housing shell surface designed to be facing, in use, against the swimming pool surface to be cleaned, a plurality of inlet openings are formed, through which swimming pool water can be sucked. The water thus sucked drags impurities and debris with it, e.g. fungi, algae, scale pieces, etc., from which the swimming pool itself must be cleaned, without the need for the swimming pool to be emptied before proceeding to a cleaning operation thereof.

The inlet openings are connected to suction means and filtering means generally comprising a pump arranged to suck water to be cleaned through the inlet openings and to send it to a filtering bag arranged within the housing shell of the cleaning machine. After filtration through the filtering bag, any sucked water is discharged into the swimming pool.

However, cleaning machines at present available on the market have some drawbacks. First of all, conventional cleaning machines are unable effectively to remove limestone and "rust" accrued and attached to the swimming pool walls. Limestone and rust removal requires hard manual work by the operator, who after a cleaning operation by means of a cleaning machine has to remove manually any scales on the swimming pool walls by means of brushes and the use of chemicals.

The filtering bag is thus liable to became obstructed quite rapidly especially if leaves, wooden fragments or other polluting elements of substantial size with respect to the dimensions of the filtering bag or through openings thereof.

When limestone, rust algae and fungi are firmly attached to the swimming pool walls, the two rotary brushes of a cleaning machine are fully inadequate to insure that the swimming pool floor and walls are satisfactorily cleaned.

Moreover, the electric cable, which plunges into water from the outside of the swimming pool for supplying the cleaning machine, represents often a risk of current escape.

SUMMARY OF THE INVENTION

The main object of the present invention is to provide a swimming pool cleaning device that is capable of eliminating or substantially reducing the above mentioned drawbacks and problems.

Another object of the present invention is to provide a cleaning device having improved ability of removing scaling, such as limestone, rust, sludge and weeds with respect to cleaning machines of conventional type.

Another object of the present invention is to provide a swimming pool cleaning machine that is much safer than conventional cleaning machines against any drawbacks due to the presence of a cable designed to supply electric current to a cleaning machine immersed in the water of a swimming pool.

Another object of the present invention is to provide a swimming pool cleaning machine that is not subjected to be frequently stopped for filter maintenance.

A further object of the present invention is to provide a cleaning machine for swimming pools, which can be manufactured at competitive costs.

According to a first aspect of the present invention, there is provided a swimming pool cleaning assembly comprising at least one ultrasonic generating means.

Advantageously, a cleaning assembly according to the present invention comprises a swimming pool cleaning machine including a support frame, a housing shell provided with a bottom wall and arranged around the support frame, driving means locatable in the housing shell, advancing means supported by said frame and arranged to be placed, in use, on a surface to be cleaned of a swimming pool and driven by said driving means, at least one water suction opening provided in the bottom surface of said housing shell, which is designed to be put in fluid communication with water suction means, said driving means being tight sealed in the housing shell and electrically connectable to supply means, wherein said ultrasonic generating means are arranged in the bottom wall of said housing shell facing, in use, a surface to be cleaned.

According to another aspect of the present invention there is provided a swimming pool cleaning device comprising a manually engaging brush member, a brush-carrying member, and a handle member to manually engage said brush member.

BRIEF DESCRIPTION OF THE DRAWINGS

Further features and advantages of a cleaning device according to the present invention will better appear from the following detailed description of some presently preferred embodiments thereof, given by way of non-limiting examples of carrying out the invention, with reference to the accompanying drawings, in which.

DESCRIPTION OF THE PREFERRED EMBODIMENTS

Figure 1:
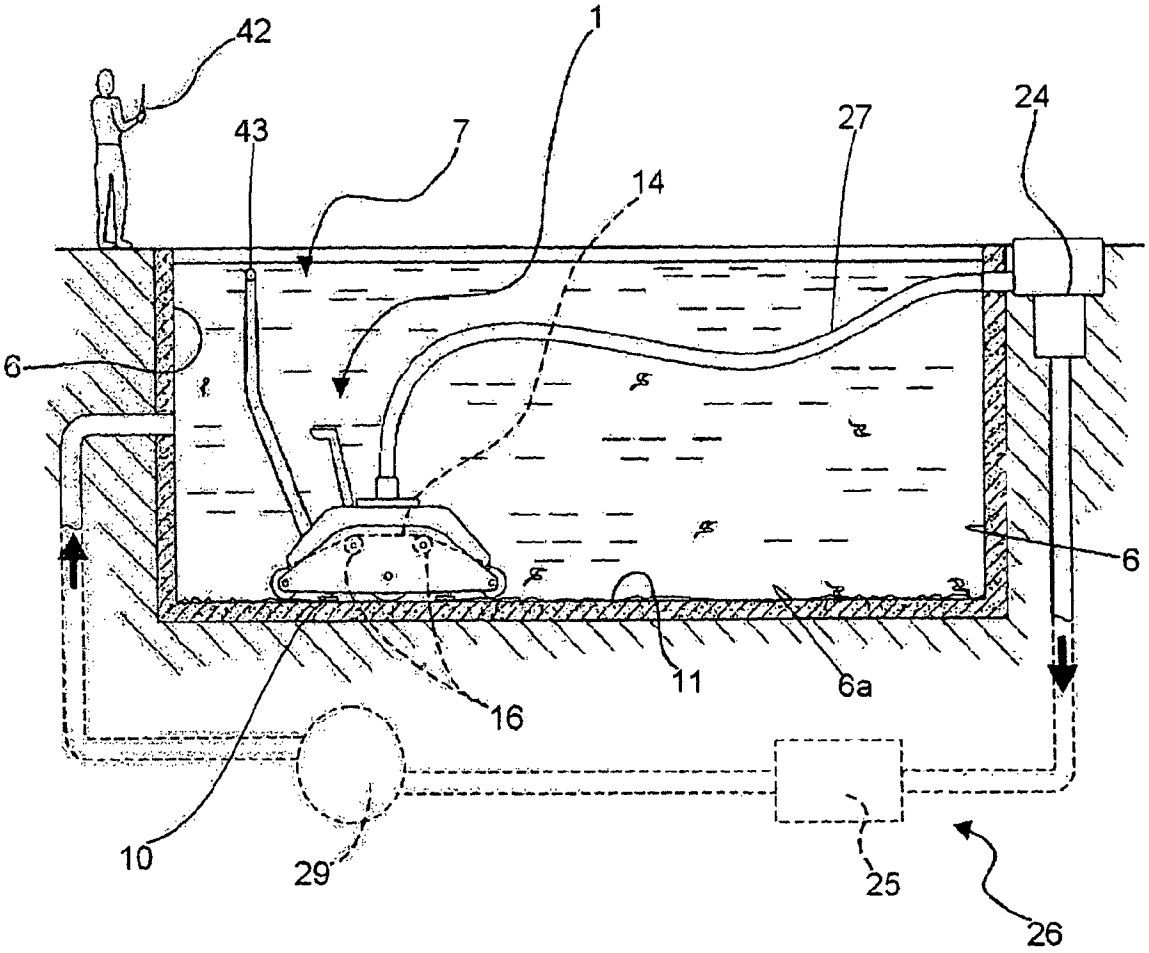
FIG. 1 is a side elevation view of a cleaning machine according to the present invention immersed in the water of a swimming pool.

In the accompanying drawings, the same or similar parts or components have been indicated with the same reference numerals.

With reference first to FIGS. 1 to 5, a cleaning device according to the present invention includes a cleaning machine 1, which comprises a housing shell 2, driving means 3, e.g. a reversible electric motor arranged within the housing shell 2, a support frame 4 which is secured in position in housing shell 2, advancing means 5 that will be described in further detail below for moving the cleaning machine 1 to and fro on a side wall 6 or the bottom 6a of a swimming pool 7, said advancing means 5 being driven by the driving means 3.

The driving means 3 are hermetically enclosed (sealed) in housing shell 2 and arranged to be electrically connected to power supply means, also further described below. Preferably, the housing shell 2 has a flat bottom 8 in which one or more openings 9 are formed, swimming pool water being sucked, in use, through such openings as housing shell 2 is in fluid communication at top thereof with suction means, e.g. a so-called "skimmer" device, a suction pump or the like.

According to the present invention, a number of ultrasonic generating means 10, e.g. an electromechanical transducer of any suitable type, are also provided in the housing shell 2, which are preferably located at the bottom of the housing shell and, if desired, extend through and out of the housing shell 2. The ultrasonic generator or generators 10 is/are designed to severe particles or microparticles of scales 11 (e.g. algae, limestone, dust, etc.) from a side wall 6 or the bottom 6a of the swimming pool.

Preferably, the ultrasonic generating means 10 are supported by the frame 4 through resilient means 12, e.g. a coil spring, whereby they are biased to extend outside the housing shell into contact with the surface 6 or 6a to be cleaned and scraped. Ultrasonic generators 10 give a high degree of efficiency to the cleaning machine 1, as they effectively break and remove any scales, which can then be easily sucked as solid portions, typically of small size, suspended in water to a great extent within a limited area in front of the bottom 8 of the housing shell and thus capable to be easily drawn back almost immediately within the housing shell itself through the suction means.

Preferably, the driving means comprises a reversible electric motor 3 fixed, e.g. flanged or bolted, to the frame 4 within the housing shell 2. If desired, the driving means comprises a motor of different type, e.g. a fluid-operated motor.

Figure 2:
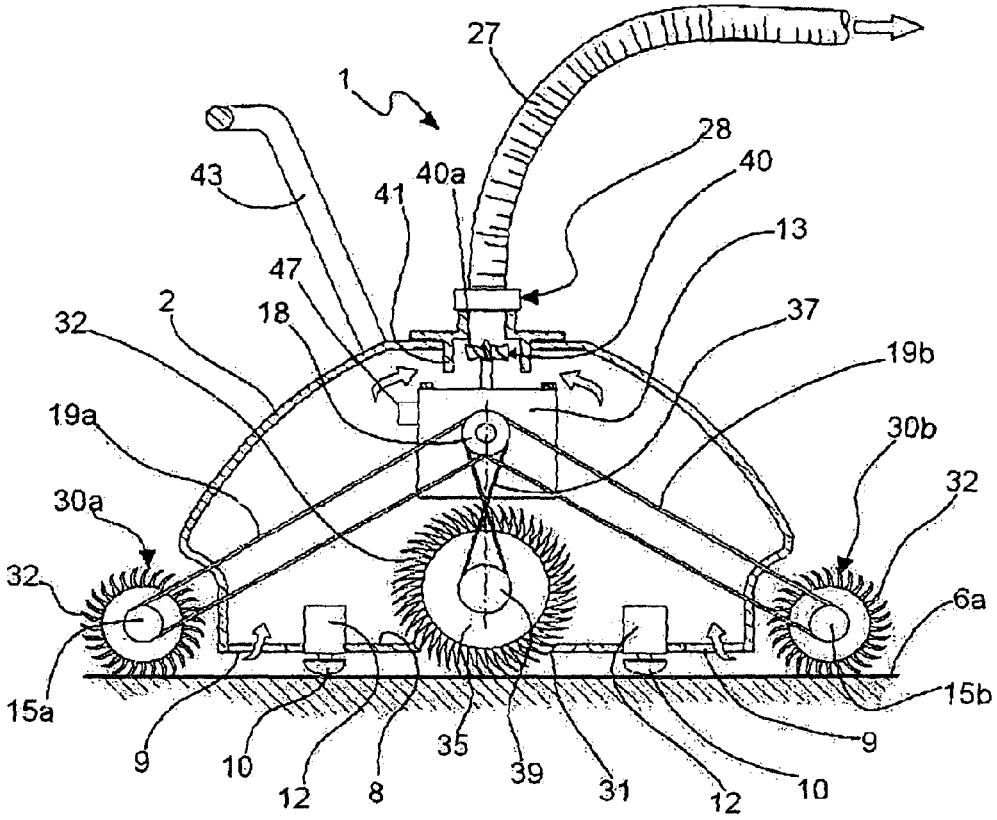
FIG. 2 is a side-elevation cross-section view of a cleaning machine according to the present invention.
Figure 3:
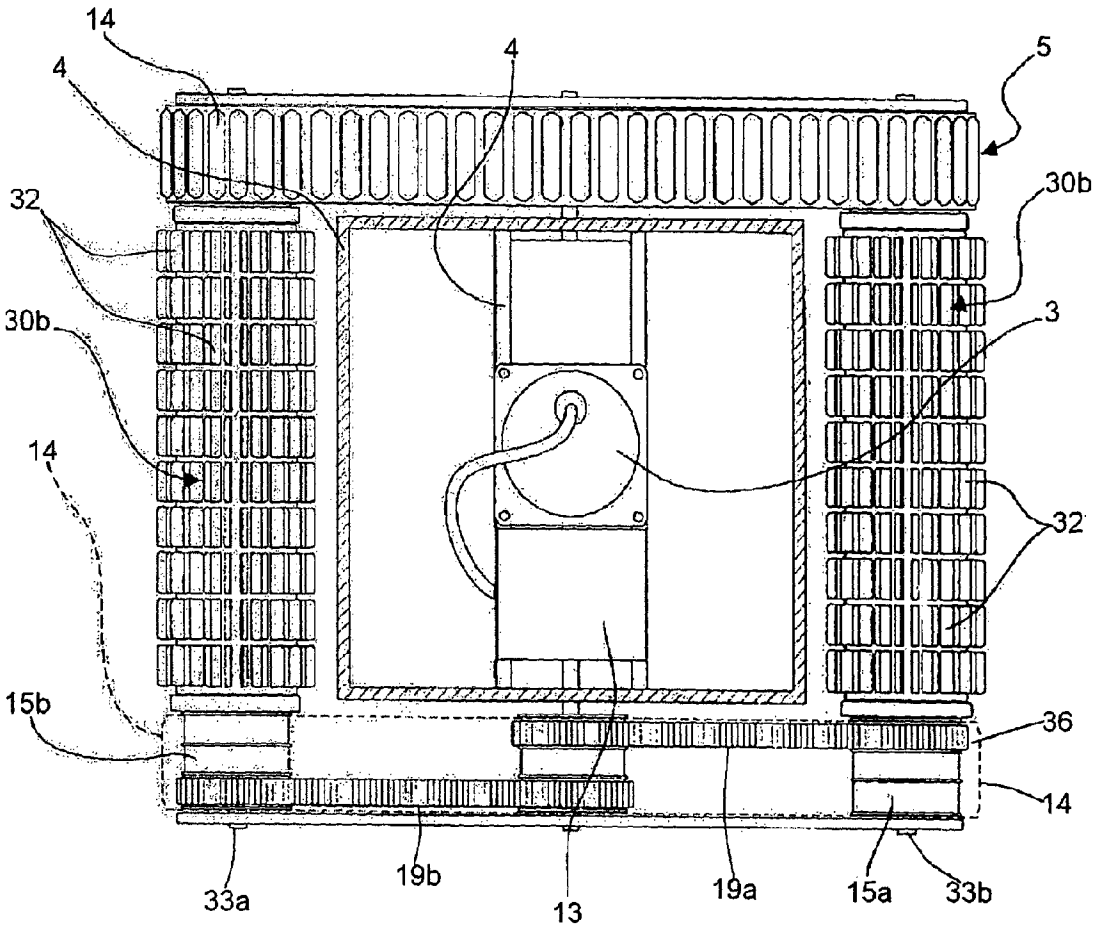
FIG. 3 is a bottom view with portions shown in cross-section of a cleaning machine according to the present invention.
Figure 4:
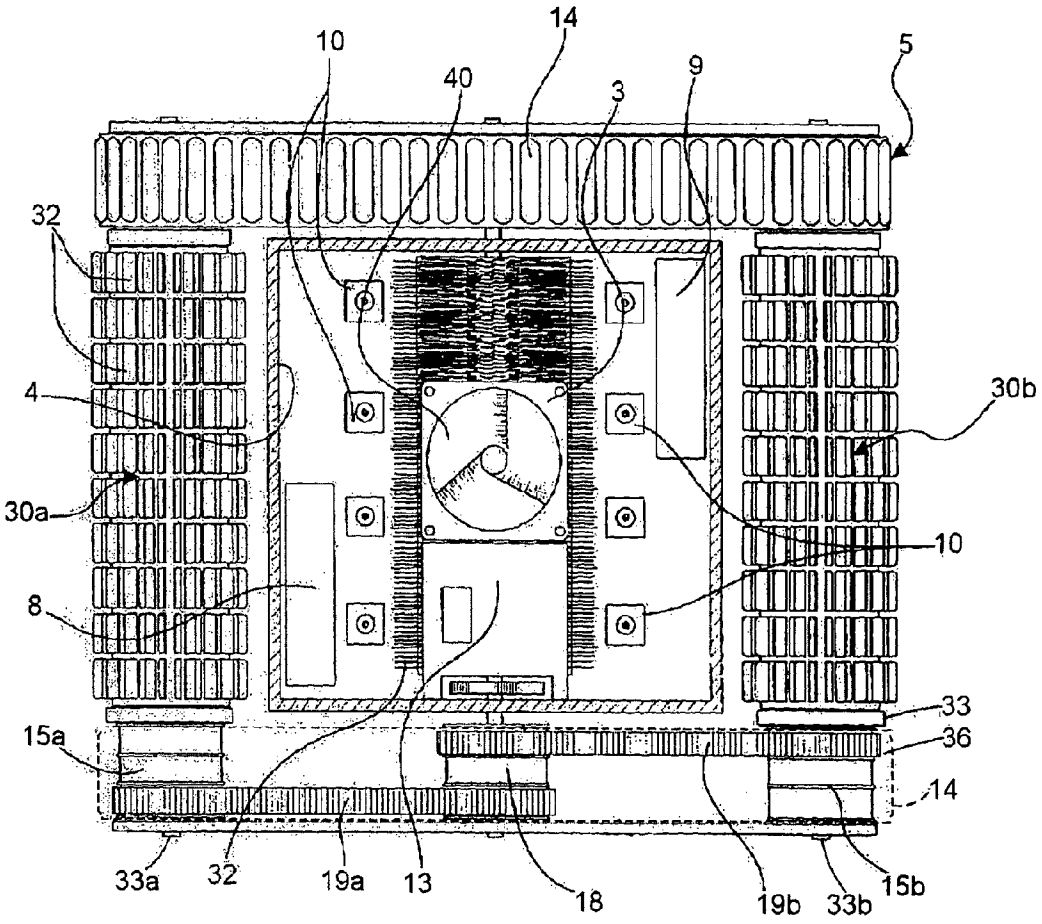
FIG. 4 is a bottom view with portions shown in cross-section of a cleaning machine according to another embodiment of the present invention.
Figure 5:
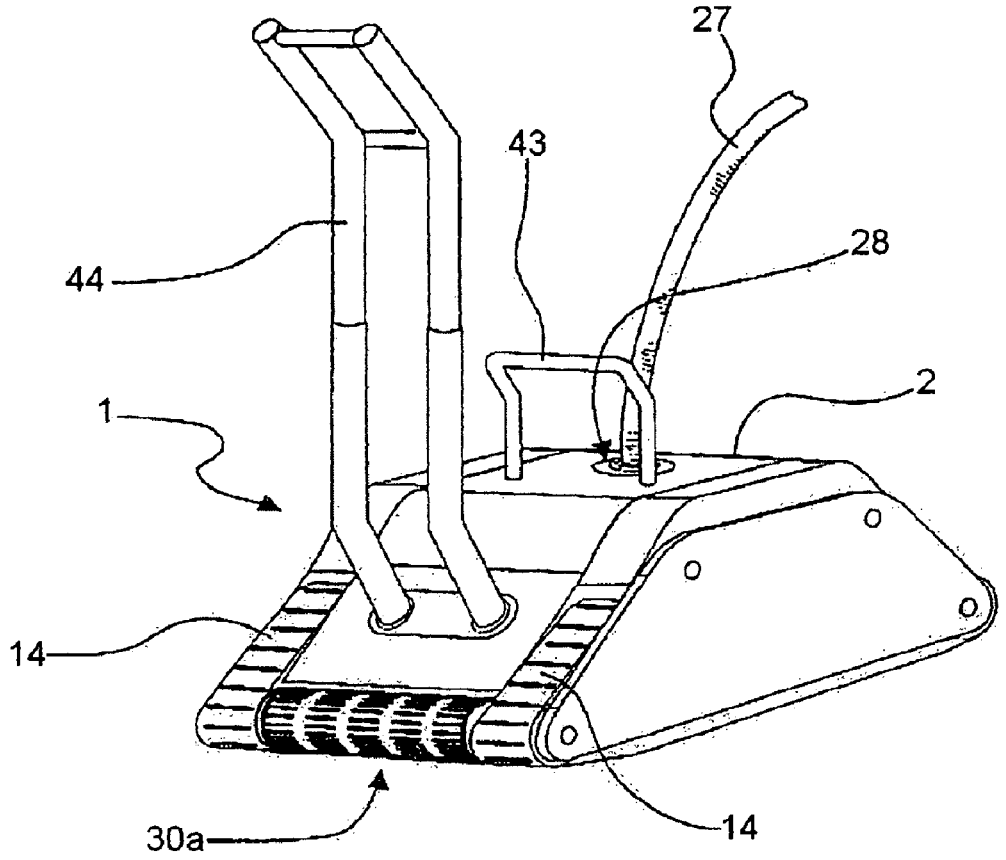
FIG. 5 is a perspective view of a cleaning machine according to the present invention.

Advantageously, power supply means for the reversible electric motor 3 can comprise a rechargeable battery 13 secured to the frame 4 and electrically connected to motor 3 (FIG. 2). The use of the rechargeable battery 13, makes it possible to avoid the presence of an electric cable immersed in the water of the swimming pool, whereby the cleaning machine 2 is safer against accidents and freer to move on the bottom or side walls of the swimming pool, without the risk for the cleaning machine to get entangled with the supply cable.

Advantageously, the advancing means for the cleaning machine 1 comprises a pair of side tracks 14 arranged at two opposed side of the frame 4 outside the housing shell 2, each track being mounted on a pair of toothed wheels 15a and 15b, and preferably held in tension by means of one ore more adjustable idle wheels 16, at least one toothed wheel being a driving wheel, i.e. it is arranged to be driven by the driving means, as will be further described below.

The tracks 14 are preferably steering tracks. To this end they are provided with any suitable steering system 17, e.g. a differential system (as that diagrammatically illustrated in FIG. 7), which make it possible to selectively brake one of the two toothed wheels 15a, 15b, e.g. by means of an electrically driven brake 17g, 17h.

Figure 7:
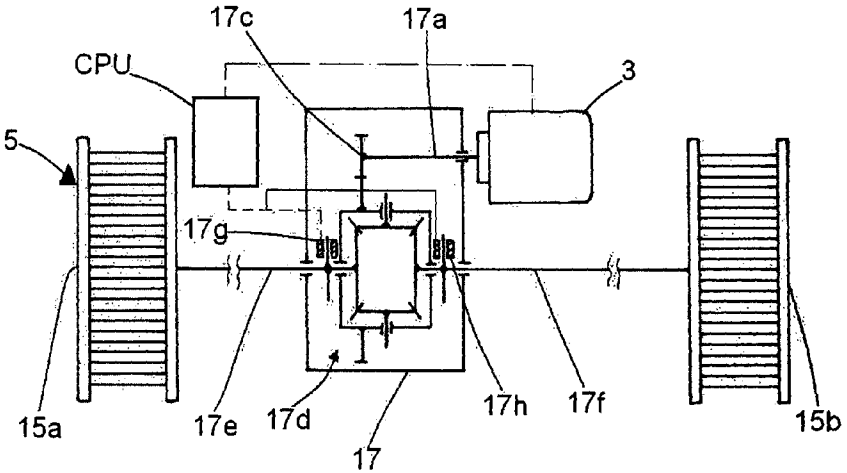
FIG. 7 is a diagrammatic view of a steering device of a cleaning machine according to the present invention.
Figure 6:
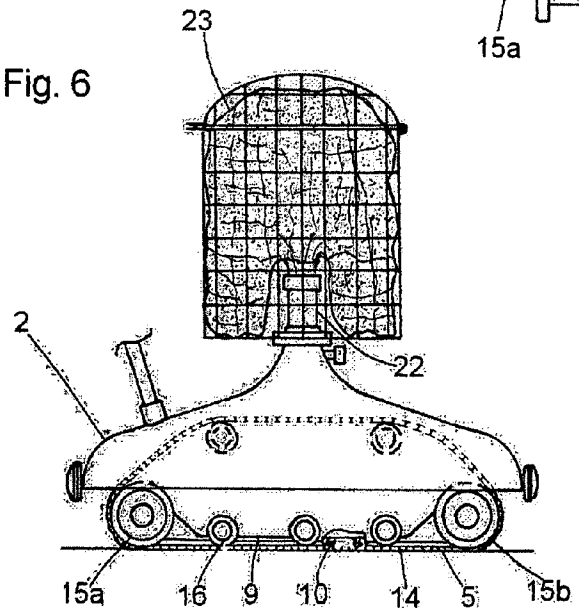
FIG. 6 is a side view of a cleaning machine according another embodiment of the present invention.
Figure 8:
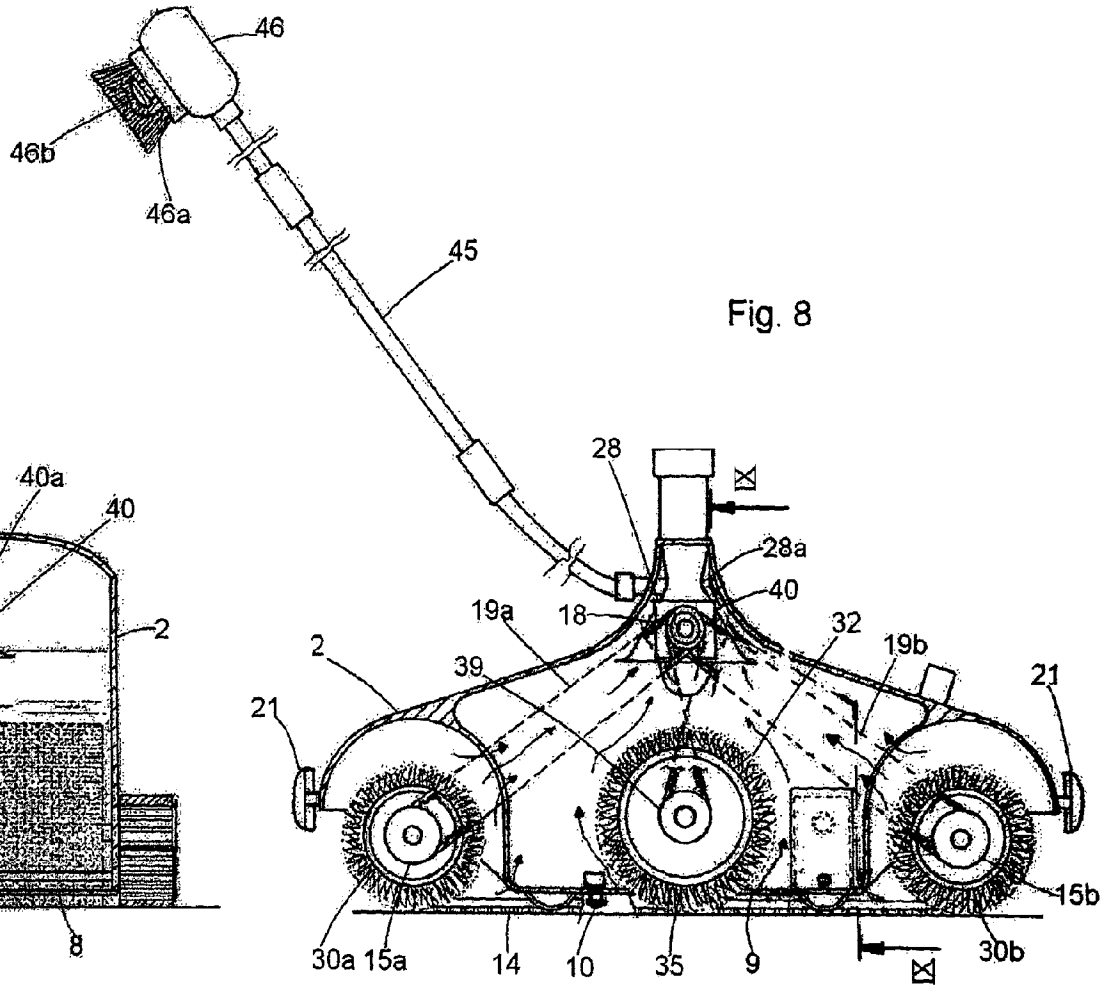
FIG. 8 is a side view with portions shown in cross-section of a cleaning machine according to another embodiment of the present invention.
Figure 9:
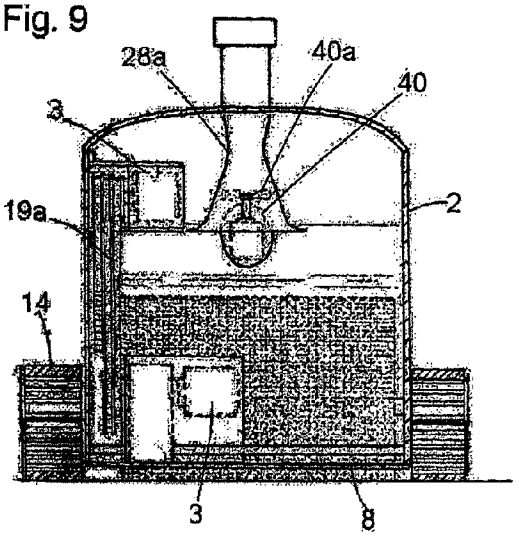
FIG. 9 is a sectional view taken along the line IX-IX of FIG. 8.

With such a steering system motion transmission is provided between the reversible electric motor 3 and a power shaft 17a (FIG. 7). Advantageously, the power shaft 17a causes one or both the toothed wheels 15a, 15b of at least one track 14 to rotate, preferably through a reduction gear 17c.

By way of example the steering system 17 comprises a differential 17d mounted on an axle including two semiaxes 17e, 17f, each supporting a respective drive wheel 15a, 15b, and a brake 17g, 17h, respectively, for each semiaxis 17e, 17f, preferably an electromagnetic disk brake.

To steer the cleaning machine 1, one brake, e.g. brake 17g, is actuated to cause semiaxis 17e slow down or to become locked, which results in the respective drive wheel 15a slowing down or being blocked and the other drive wheel 15d simultaneously accelerating, thereby changing the direction of movement of the cleaning machine 1.

According to a particular embodiment of the invention, the reversible electric motor 3 controls a drive pulley 18 (FIG. 2), which is operatively connected to the toothed wheels 15a, 15b of a track 14 e.g. by means of transmission belts 19a, 19b. Thus, when the reversible electric motor 3 causes the drive pulley 18 to rotate, also at least one drive wheel 15a, 15b, and consequently the track 14, and the other track, or both tracks 14 are set in rotation.

Clearly, the steering system can be also comprise a conventional steering system of any suitable type, e.g. a system arranged to lift one of the tracks by means of a telescopic rod or arm.

The operation of motor 3, and thus of tracks 14, and brakes 17g and 17f is advantageously controlled by a programmable control unit PCU, which also electrically connected to sensor means, e.g. mechanical detector devices or infrared sensors 21 located at the front and the back of the cleaning machine 1, which are energized when the cleaning machine abuts against a swimming pool side wall in order to send a control signal to the control unit PCU, that generates output control signals designed to invert the direction of rotation of motor 3 and possibly to control the steering system to change the direction of movement of the cleaning machine 1.

Suction means can comprise a skimmer 24 of any suitable type and/or a pumping device 25 and a filtering plant or a water regeneration system 26, usually provided in a swimming pool 7. The pumping device 25 is arranged to suck water through the cleaning machine 1 by means of a flexible pipe 27, having one end thereof connected through a flange 28 to the housing shell 2 of the cleaning machine 1, and its other end connected to the skimmer 24 or some other kind of discharge.

The pumping device 25 sucks water from the swimming pool, possibly pre-filtered by the skimmer 24, and feeds it to a filtering device 29 (e.g. a sand filter). The water filtered by the filtering device 29 is then delivered back to the swimming pool 7 through a delivery opening.

According to a preferred embodiment of the present invention (FIGS. 2 to 11) the cleaning machine 1 further comprises brushing members 30a and 30b mounted for rotation on the support frame 4 outside the housing shell 2 and arranged to be rotated by driving means, e.g. the motor 3, in order to brush the surfaces 6, 6a, to be cleaned.

A cleaning machine 1 according to the present invention preferably comprises two brushing member 30a and 30b mounted for rotation on the support frame 4 and having their axes of rotation parallel to, and spaced from, one another and to semiaxes 17e and 17f, thereby providing two opposed cleaning front sides underneath cleaning machine. Each brushing member 30a and 30b can comprise a plastics cylinder, which is provided with a plurality of lugs, tangs 32 or other bristle-like members for brushing a work surface 6 or 6a to be cleaned.

Advantageously, brushing members 30a, 30b are set in rotation by motor 3 through a motion transmission means 36 e.g. comprising a drive pulley keyed onto the output shaft of motor 3, a pair of motion transmission belts suitable for transmitting the motion from the drive pulley to the brushing members 30a, 30b.

According to a specific embodiment (better illustrated in FIGS. 2 to 4) the plastics cylinder of each brushing member has lateral hubs 33a and 33b, each supporting a respective multiple pulley keyed thereon, i.e. a pair of pulleys 15a and a pair of pulleys 15b, on which two transmission belts are mounted 19a and 19b, respectively, which are also wound around a common drive pulley 18 rigid in rotation with the output shaft of motor 3. The transmission belts 19a and 19b are preferably toothed belts, and are arranged to transmit motion to the toothed wheels 15a, 15b and thus to the tracks and the brushing members 30a, 30b.

Cleaning machine 1 can also comprise a third rotary brushing member 35 mounted for rotation on the support frame 4 at an intermediate position between the brushing members 30a and 30b and having an axis of rotation parallel thereto. Brushing member 35 projects from an opening or notch 31 formed in the bottom 8 of housing shell 2 between two arrays of openings 9. The brushing member 35 is also preferably controlled by the motor 3 through a motion transmission means, e.g. a transmission belt 37 and is formed of a plastics cylinder provided with a plurality of lugs or tangs 32 or the like in a similar way as the brushing members 30a, 30b in order to provide a further brushing action on the surface 6 or 6a to be cleaned. The transmission belt 37 is preferably crossing thereby causing the brushing member 35 to rotate in a direction opposite to that of the brushing members 30a and 30b.

Thus the brushing members 30a and 30b are designed to rotate in the same direction as that of tracks 14, whereas the brushing member 35 rotates in the opposite direction to insure high efficiency in removing deposits, dirt, slush and scales present from the work surface to be cleaned and possibly already affected by a brushing member 30a or 30b. The belt 37 is driven by the drive pulley 18 and by a pulley integral in rotation with, e.g. keyed to, a hub of the intermediate brushing member 35.

Thus, the intermediate brushing member 35 while rotating in a direction opposite to that of the brushing members 30a and 30b insures an effective removing action on dirt and slush which can then be carried away by water sucked through the openings 9.

According to a preferred embodiment of the present invention (better shown in FIG. 4) a cleaning machine 1 is provided preferably with two arrays each including four ultrasonic generators 10 aligned along a transversal direction with respect to the direction of movement of the cleaning machine 1 and arranged between one or more openings 9 and the intermediate brushing member 35.

According to another embodiment of the present invention, at the top of housing shell 2 of the cleaning machine 1 an opening can be formed from which a connecting sleeve 22 extends for connection to a filtering member 23, e.g. bag-shaped filter supported on a frame, designed to filter water sucked by suction means, e.g. a pump 40 of any suitable type (FIGS. 2 and 6) located in the housing shell 2. Any water sucked through the connecting sleeve 22 by the suction means is filtered by the filtering member 23 and then discharged into the swimming pool as filtered water, i.e. deprived from dirt (algae, limestone, rust, etc.), that remains trapped in the filtering member 23, that is cleaned and/or replaced from time to time.

The pump 40 is preferably located at the top within the housing shell 2, and is arranged to be operated by motor 3 through any suitable motion transmission means independent from the motion transmission to tracks 14 and brushing members 30a, 30b, and 35. Pump 40 is designed to suck water through the bottom openings 9 and to deliver it to the flexible pipe 27 or the bag-shaped member 23.

Advantageously, a grinding means of any suitable type is provided in the housing shell 2 upstream of the flange 28 to which the suction pipe 27 or the filtering member 23 is connected. The grinding means is designed to grind any coarse material, such as algae, leaves, branches, etc. before they reach pipe 27 or the filtering member 23. The grinding means preferably comprises an additional rotor in the suction pump 40 having sharp vanes 40a arranged to rotate coaxially with the main rotor of the pump 40 and at least partly within a sleeve 41, e.g. rigid with the flange 28 and extending inwardly into the housing shell 2.

In accordance with an advantageous modification of a cleaning machine according to the present invention, the programmable control unit PCU is controllable by a remote control 42. Thus, by using the remote control 42 an operator can control the cleaning machine 1 during all cleaning steps while staying out of the swimming pool.

Cleaning machine 1 can be also have a control handle 43 with a guide handlebar 44, preferably of a telescopic type, which is quite handy for manual handling of the cleaning machine 1, and a control console (not shown in the drawings) supported on the guide handlebar 44.

According to another embodiment of the present invention (see in particular FIG. 8), there is provided an auxiliary cleaning device comprising a head member 46 carrying one or more brushes 46a preferably of the type mounted for rotation in the head member 46, and controlled by a driving means, e.g. an electric motor of any suitable type, not shown in the drawings, one or more ultrasonic generating means 46b carried by the head member 46 close to the bush 46a, and a handle 45, preferably a tubular type.

One or more openings, preferably facing the brush 46, are formed in the head member 46, that can be set in fluid communication through the handle 45 with suction means, e.g. the pump 40 in cleaning machine 1 or the suction means provided for the swimming pool (e.g. a skimmer) In a preferred embodiment, the head member 46 is also formed with one or more openings, preferably facing the bush 46, in fluid communication with a source of a detergent and/or a solvent and the like, thereby supplying, in use, one or more chemicals on the very spot on an inner surface of the swimming pool where the head member 46 is operating.

When the operator must fully clean some areas of an inner wall 6 or the bottom surface 6a of the swimming pool, where limestone, algae, etc are firmly attached to the surface, he can manually use the auxiliary cleaning device, e.g. by setting in rotation the brush 46a, energizing the ultrasonic generator 46b, starting the pump 40 to suck water also through the openings in the head member 46, as well as by delivering detergent or solvent to assist in the breaking and removing action of the ultrasonic generator 46b and the brush 46a.

Thus, the brush 46a makes it possible to carry out a thorough cleaning of all the inner surfaces of the swimming pool, even those that cannot be reached easily by the cleaning machine 1, such as narrow corners and particularly the so called "top level area", i.e. the area between the water level and the top edge of the swimming pool that becomes easily covered with solid incrustation.

According to another embodiment of the present invention (FIGS. 8 and 9), the flange 28 can be a three-way flange with a bottleneck 28a (acting as a Venturi tube) at an intermediate portion thereof, a first way being in communication with the housing shell 2, a second way arranged on opposite side with respect to, and facing away from, the bottleneck 28a for connection, e.g. to a flexible suction pipe 27, and a third way being connected, through pipe 45, to the head member 46. In this embodiment, the PCU can be programmed so that, when water starts being sucked from the head member 46 (e.g. for cleaning the top level area of the swimming pool), tracks 14 and brushing members 30a, 30b, and 35 are kept idle.

Figure 10:
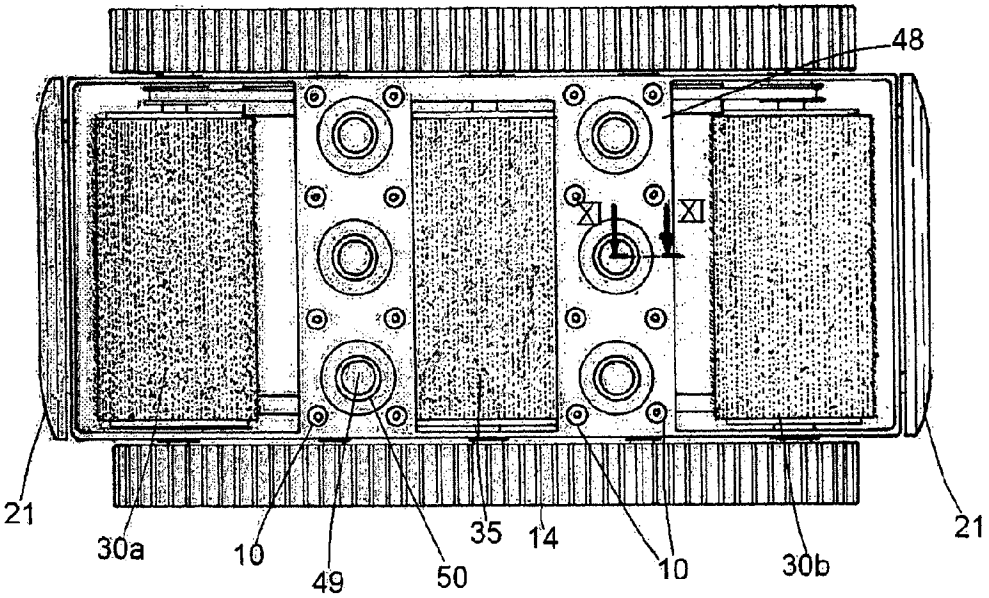
FIG. 10 is a bottom view of a cleaning machine according to the present invention.
Figure 11:
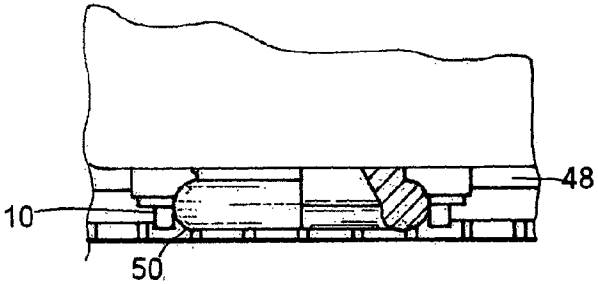
FIG. 11 is a sectional view taken along the line XI-XI of FIG. 10.

With reference to the embodiment shown in FIGS. 2, 10 and 11, a cleaning machine 1 according to the present invention ran be provided with a climbing system along vertical or otherwise sloping walls. To this end, the cleaning machine is provided with a mercury sensor 47 of any suitable type and a plate 48 on the bottom of the housing shell 2, in which there is provided one or more through openings or openings 49 each having its outer edge provided with an annular seal, e.g. a rubber seal 50, which is, in use, substantially close to the surface 6 to be cleaned. The openings 49 can be the openings 10 or additional openings.

When the mercury sensor 47 detects that the cleaning machine 1, moved by tracks 14, is coming close to a vertical or otherwise sloping wall, it sends a control signal to the control unit PCU which, in turn, will energize the motor 3 for starting the pump 40 thereby generating a greater water suction effect through openings 49 to obtain a high adherence action of the cleaning machine to the wall to be cleaned. Owing to such a greater suction effect controlled by the PCU, the cleaning machine 1 can remain adherent to a sloping or vertical wall while being able to move up and down along it to exert a cleaning action thereon.

From the above it should appear that the described invention is suitable for solving the problems connected with the use of conventional cleaning machines.

Thus, a cleaning machine 1 according to the present invention, owing to the presence of ultrasonic generator(s) 10, ensures in combination with the brushing action of rotary brushes 32, 35 an effective limestone removal A cleaning machine as above described is susceptible to numerous modifications and variations within the scope as defined by the claims.

Thus, for example, the steering system can comprise two semiaxes having a respective brake and clutch assembly of any suitable type, drivable in synchronism by the unit PCU.

The invention claimed is:

1. A [swimming pool] cleaning assembly comprising [at least one ultrasonic wave generator which generator severs particles of microparticles of scales from a side wall or the bottom of the swimming pool by ultrasonic waves, Comprising]: a swimming pool cleaning machine including a support frame, a housing shell [provided with a bottom wall and arranged around the support frame], *a* driving structure located in said housing shell, *an* advancing structure supported by said frame and arranged to be placed, in use, on a surface to be cleaned of a swimming pool and driven by said driving structure, [at least one water suction opening provided in the bottom surface of said housing shell, which is designed to be put in fluid communication with water suction structure, said driving structure being tight sealed in the housing shell and electrically connectable to supply structure, wherein at least one said ultrasonic generator is arranged at said bottom wall facing, in use, said surface to be cleaned, at least one] front and rear brushing [member] *members* and at least one intermediate brushing member for *brushing* the surface to be cleaned[, mounted for rotation on said frame and driven by said driving structure, and comprising said at least one front and rear brushing member and at least one intermediate brushing member and in that are arranged substantially parallel to one another.]*; wherein the intermediate brushing member is spaced apart from the front and rear brushing members; and wherein the intermediate brushing member is arranged to rotate about an axis of rotation.*

2. A cleaning assembly as claimed in claim 1, [comprising resilient structure suitable for yieldingly biasing said ultrasonic generator towards said surface to be cleaned] *wherein the intermediate brushing member is positioned between the front and rear brushing members.*

3. A cleaning assembly as claimed in claim 1, [comprising at least one front and rear brushing member for the surface to be cleaned, mounted for rotation on said frame and driven by said driving structure] *wherein the axis of rotation of the intermediate brushing member is parallel to an axis of rotation of each of the front and rear brushing members.*

4. A cleaning assembly as claimed in claim [3] *1*, comprising *a* first motion transmission structure arranged to transmit motion from said driving structure to [said] at least one brushing member *of the front and rear brushing members.*

5. A cleaning assembly as claimed in claim 4, wherein said first motion transmitting structure comprises at least one transmission belt wound around a driving pulley driven by said driving structure and a driven pulley rigid in rotating with said at least one brushing member *of the front and rear brushing members.*

6. A cleaning assembly as claimed in claim [3] *1*, wherein [said] at least one *of the* front and rear brushing [member comprise each] *members comprises* a cylinder provided with a plurality of brushing lugs.

7. A cleaning assembly as claimed in claim 1, [comprising at least one intermediate brushing member for said surface to be cleaned, mounted for rotation on said frame through said bottom wall and arranged to be driven by said driving structure] *comprising at least one water suction opening provided in the housing shell, which is designed to be put in fluid communication with a water suction structure.*

8. A cleaning assembly as claimed in claim [7] *1*, comprising *a* second motion transmission structure arranged to transmit motion from said driving structure to said at least one intermediate brushing member.

9. A cleaning assembly as claimed in claim [7] *1*, comprising *a* second motion transmission structure arranged to transmit motion from said driving structure to said at least one intermediate brushing member, wherein second motion transmission structure comprises at least one belt wound around a driving pulley designed to be driven by said driving structure, and a driven pulley rigid in rotation with said at least one intermediate brushing member.

10. A cleaning assembly as claimed in claim [7] *9*, wherein said second motion transmission structure is designed to cause said at least one intermediate brushing member to rotate in a direction opposite to that of [said] *a* first transmission structure *that is arranged to transmit motion from said driving structure to at least one brushing member of the front and rear brushing members*.

11. A cleaning assembly as claimed in claim [7] *1*, comprising a plurality of ultrasonic generators [arranged aligned between said at least one opening and said at least one intermediate brushing member].

12. A cleaning assembly as claimed in claim [7] *1*, wherein said at least one intermediate brushing member comprise each a cylinder provided with a plurality of brushing lugs.

13. A cleaning assembly as claimed in claim 1, comprising *a* third motion transmission means [operatively connected between] *arranged to transmit motion from* said driving structure and said advancing structure.

14. A cleaning assembly as claimed in claim [1] *13*, wherein said third motion transmission structure comprises at least one transmission belt wound around at least one driving pulley arranged to be driven by said driving structure, and at least one driven pulley arranged to drive said advancing structure.

15. A cleaning assembly as claimed in claim 1, wherein said advancing structure are rigid in rotation and coaxial with said at least one *brushing member of the* front and rear brushing member or said at least one intermediate brushing member.

16. A cleaning assembly as claimed in claim 1, wherein said advancing structure comprises at least one pair of tracks, at least one driving wheel, and at least one idle transmission wheel for said *at least one pair of* tracks, said at least one driving wheel being operatively connectable to said driving structure.

17. A cleaning assembly as claimed in claim [16] *1*, [wherein said] *comprising a* programmable control unit [can] *that is arranged to* be remotely operated.

18. A cleaning assembly as claimed in claim 1, comprising a [controllable] *programmable* control unit, and a steering system arranged to be controlled by said programmable control unit.

19. A cleaning assembly as claimed in claim 18, wherein said steering system comprises*:* a differential system inserted on an axle comprising semiaxes, each *semiaxis of the semiaxes* supporting a respective driving wheel of at least one pair of tracks, and a braking structure for each semiaxis.

20. A cleaning assembly as claimed in claim [1] *7*, comprising a programmable control unit [designed] *that is arranged* to control *at least one out of* said driving structure and[/or said] *a* suction structure.

21. A cleaning assembly as claimed in claim [20] *19*, wherein said braking structure comprises an electromagnetic disc brake.

22. A cleaning assembly as claimed in claim 1, wherein said driving structure comprises a reversible electric motor carried by said *support* frame inside said housing shell.

23. A cleaning assembly as claimed in claim 1, [wherein said] *comprising a* supply structure for said driving structure*, wherein the supply structure* comprises an electric battery.

24. A cleaning assembly as claimed in claim [1] *7*, wherein said *water* suction structure comprises a [pump] *pumping* member suitable for sucking water from said at least one opening.

25. A cleaning assembly as claimed in claim 24, comprising a flexible pipe arranged to establish fluid communication between said pumping member and a water regeneration system of said swimming pool.

26. A swimming pool cleaning assembly as claimed in claim [1] *25*, [comprising a swimming pool cleaning machine including a support frame, a housing shell provided with a bottom wall and arranged around the support frame, driving means located in said housing shell, advancing means supported by said frame and arranged to be placed, in use, on a surface to be cleaned of a swimming pool and driven by said driving means, at least one water suction opening provided in the bottom surface of said housing shell, which is designed to be put in fluid communication with water suction means, said driving means being tight sealed in the housing shell and electrically connectable to supply means, and said] *wherein the water* suction [means comprising] *structure comprises at least one out of* a suction opening [or], a skimmer[,] *and* a filtering plant[, a pumping device for said filtering plant and are installed in said swimming pool, wherein a flexible pipe is provided to put in fluid communication said housing shell of said machine and said suction opening or skimmer].

27. A cleaning assembly as claimed in claim 26, comprising a pumping member designed to supply any sucked water to said flexible pipe.

28. A cleaning assembly as claimed in claim 26, comprising a programmable control unit [and a pumping member,] and *a* trim [detecting means] *detector* designed to send control signals to said *programmable control* unit to adjust *a* pumping action of said pumping member and generate a adherence effect to a sloping surface to be cleaned.

29. A cleaning assembly as claimed in claim 26, comprising a handle and a guide handlebar.

30. A cleaning assembly as claimed in claim 26, comprising a bag-shaped filtering member securable to said housing shell [and] *that is* arranged to intercept any sucked solid material in any sucked water flowing therethrough.

[31. A cleaning assembly as claimed in claim 26, comprising a bag-shaped filtering member securable to said housing shell and arranged to intercept any sucked solid material in any sucked water flowing therethrough.]

32. A swimming pool cleaning assembly as claimed in claim 1, comprising [a swimming pool cleaning machine including a support frame, a housing shell provided with a bottom wall and arranged around the support frame, driving means located in said housing shell, advancing means supported by said frame and arranged to be placed, in use, on a surface to be cleaned of a swimming pool and driven by said driving means, at least one water suction opening provided in the bottom surface of said housing shell, which is designed to be put in fluid communication with water suction means, said driving means being tight sealed in the housing shell and electrically connectable to supply means, said cleaning assembly comprising] grinding means [for] *that is arranged to grind* any sucked solid body.

33. A cleaning assembly as claimed in claim 32, wherein said grinding means are arranged at an outlet opening of said housing shell.

34. A cleaning assembly as claimed in claim 32, comprising a pumping member, [and in that] *wherein* said grinding means comprises a sharp vane rotor member [in said pumping member].

35. A cleaning assembly as claimed in claim 32, comprising a programmable control unit and a pumping member, and *a* trim [detecting means designed] *detector that is arranged* to send control signals to said *programmable control* unit to adjust *a* pumping action of said pumping member and generate a adherence effect to a sloping surface to be cleaned.

36. A cleaning assembly as claimed in claim 32, comprising a handle and a guide handlebar.

37. A cleaning assembly as claimed in claim 32, comprising a bag-shaped filtering member securable to said housing shell and arranged to intercept any sucked solid material in any sucked water flowing therethrough.

[38. A cleaning assembly as claimed in claim 32, comprising a bag-shaped filtering member securable to said housing shell and arranged to intercept any sucked solid material in any sucked water flowing therethrough.]

39. A cleaning assembly as claimed in claim 1, comprising a programmable control unit and a pumping member, and trim detecting means designed to send control signals to said unit to adjust pumping action of said pumping member and generate a adherence effect to a sloping surface to be cleaned.

[40. A cleaning assembly as claimed in claim 1, comprising a programmable control unit and a pumping member, and trim detecting means designed to send control signals to said unit to adjust pumping action of said pumping member and generate a adherence effect to a sloping surface to be cleaned.]

41. A cleaning assembly as claimed in claim 1, comprising a handle and a guide handlebar.

42. A cleaning assembly as claimed in claim 1, comprising a bag-shaped filtering member securable to said housing shell and arranged to intercept any sucked solid material in any sucked water flowing therethrough.

43. A cleaning assembly as claimed in claim [1] *7*, wherein [said] *a* bottom wall *of the housing shell* is formed with at least one suction opening provided with at least one gasket member.

44. A cleaning assembly as claimed in claim 1, comprising [at least one brushing member,] a brush-carrying head member[,] and handle member for manually handling said *brush-carrying* head member.

45. A cleaning assembly as claimed in claim 44, comprising *a* water suction structure.

46. A cleaning assembly as claimed in claim 45, [characterised in that] *wherein* said brush-carrying head member is in fluid communication with *a* suction structure.

47. A cleaning assembly as claimed in claim 44, wherein said brush-carrying member is in fluid communication with a source of chemicals.

*48. A cleaning assembly as claimed in claim 1, further comprising at least one ultrasonic wave generator which generator severs particles of microparticles of scales from a side wall or the bottom of the swimming pool by ultrasonic waves.*

* * * * *